(12) United States Patent
Noh et al.

(10) Patent No.: US 11,390,177 B2
(45) Date of Patent: Jul. 19, 2022

(54) VEHICLE AND METHOD FOR CONTROLLING THE SAME

(71) Applicants: Hyundai Motor Company, Seoul (KR); Kia Motors Corporation, Seoul (KR); Yura Corporation Co., Ltd., Gyeonggi-do (KR)

(72) Inventors: JeongHa Noh, Gyeongsangnam-do (KR); Beob Mo Seong, Jeollabuk-do (KR); Sang Yeon Kim, Seoul (KR); Dueg Ki Shin, Gyeonggi-do (KR)

(73) Assignees: Hyundai Motor Company, Seoul (KR); Kia Motors Corporation, Seoul (KR); Yura Corporation Co., Ltd., Gyeonggi-do (KR)

(*) Notice: Subject to any disclaimer, the term of this patent is extended or adjusted under 35 U.S.C. 154(b) by 859 days.

(21) Appl. No.: 16/214,650

(22) Filed: Dec. 10, 2018

(65) Prior Publication Data

US 2020/0122593 A1    Apr. 23, 2020

(30) Foreign Application Priority Data

Oct. 22, 2018 (KR) .......................... 10-2018-0126150

(51) Int. Cl.
*B60L 53/16* (2019.01)
*B60L 53/60* (2019.01)
(Continued)

(52) U.S. Cl.
CPC .............. *B60L 53/16* (2019.02); *B60L 53/60* (2019.02); *H04B 3/544* (2013.01); *H04B 3/546* (2013.01); *H04B 3/56* (2013.01); *B60L 2200/18* (2013.01)

(58) Field of Classification Search
CPC ...... B60L 2200/18; B60L 53/11; B60L 53/14; B60L 53/16; B60L 53/30; B60L 53/31;
(Continued)

(56) References Cited

U.S. PATENT DOCUMENTS 9,026,813 B2 * 5/2015 Zyren ................... G06F 1/3203
713/310
10,576,834 B2 * 3/2020 Lee .......................... B60L 53/65
(Continued)

FOREIGN PATENT DOCUMENTS

EP    2 802 056 A1    11/2014
JP    2013-51874 A    3/2013
(Continued)

OTHER PUBLICATIONS

Homeplug: "HomePlug Green PHY Specification Release Version", Aug. 25, 2018, pp. 738-743 (XP055547780).
(Continued)

*Primary Examiner* — Hunter B Lonsberry
*Assistant Examiner* — Daniel L Greene
(74) *Attorney, Agent, or Firm* — Fox Rothschild LLP

(57) ABSTRACT

A vehicle and a method for controlling the same are disclosed. The vehicle may include a plurality of charging ports electrically coupled to a first connector and a second connector, each of the first and second connectors configured to receive power from at least one charger; and a controller configured to receive a charging start command and, upon receiving the charging start command, to control operation of the vehicle to be sequentially paired with the first connector and the second connector when the first connector and the second connector are electrically coupled to the plurality of charging ports.

16 Claims, 11 Drawing Sheets

(51) Int. Cl.
*H04B 3/54* (2006.01)
*H04B 3/56* (2006.01)

(58) Field of Classification Search
CPC ...... B60L 53/60; B60L 53/126; B60L 53/305; H04B 3/544; H04B 3/546; H04B 3/56; Y02T 10/70; Y02T 10/7072; Y02T 90/12; Y02T 90/14; Y02T 90/16; B60Y 2200/91; H04L 12/12
See application file for complete search history.

(56) References Cited

U.S. PATENT DOCUMENTS

| | | | |
|---|---|---|---|
| 10,999,331 B1* | 5/2021 | Marchand | H04L 65/403 |
| 2004/0024913 A1* | 2/2004 | Ikeda | H04B 3/54 |
| | | | 709/249 |
| 2013/0162221 A1* | 6/2013 | Jefferies | B60L 53/11 |
| | | | 320/155 |
| 2015/0189581 A1 | 7/2015 | Katar et al. | |
| 2016/0075245 A1* | 3/2016 | Logvinov | B60L 53/20 |
| | | | 320/108 |
| 2016/0114692 A1 | 4/2016 | Tripathi et al. | |
| 2016/0325634 A1* | 11/2016 | Foldesi | B60L 53/20 |
| 2017/0223807 A1* | 8/2017 | Recker | H02J 13/00006 |

FOREIGN PATENT DOCUMENTS

| | | |
|---|---|---|
| JP | 5478174 B2 | 4/2014 |
| JP | 5955714 B2 | 7/2016 |
| KR | 10-2011-0042403 A | 4/2011 |
| KR | 10-2012-0114074 A | 10/2012 |
| KR | 10-1336794 B1 | 12/2013 |
| KR | 10-2016-0146296 A | 12/2016 |
| KR | 10-2017-0098002 A | 8/2017 |
| KR | 10-2017-0125586 A | 11/2017 |

OTHER PUBLICATIONS

M. Kubel, "Design Guide for Combined Charging System Combined Charging System", Aug. 8, 2018, (XP055548194).
European Search Report dated Feb. 7, 2019 in corresponding EP Application No. 18210955.3.

* cited by examiner

VEHICLE AND METHOD FOR CONTROLLING THE SAME

CROSS-REFERENCE TO RELATED APPLICATION

This application is based on and claims priority under 35 U.S.C. § 119 to Korean Patent Application No. 10-2018-0126150, filed on Oct. 22, 2018 in the Korean Intellectual Property Office, the disclosure of which is incorporated by reference in its entirety.

BACKGROUND

1. Field

Embodiments of the present disclosure relate to a vehicle, and more particularly to a technology for charging a vehicle using a plurality of chargers, resulting in reduction of charging time.

2. Description of the Related Art

Unlike general vehicles designed to obtain drive power from the combustion of fossil fuels, electric vehicles (EVs) are designed to obtain drive power from electricity. The main energy source of an EV is a battery. The development of an improved battery having a lighter weight, smaller size, and shorter charging time has a significant impact on the development of EVs.

A conventional EV charging scheme involves connecting a vehicle provided with a large-capacity battery and a single charging port to a charger through the charging port on a one-to-one basis, allowing the vehicle to be charged with electricity. In order to reduce a total charging time of the EV using this scheme, a capacity of the charger and a capacity of each constituent component embedded in the EV must be increased. Consequently, however, infrastructure costs for propagation of such chargers will increase, resulting in an increase of production costs and EV weight.

In order to address the above issues, an improved EV having a plurality of charging ports has been proposed, enabling the vehicle to be charged more quickly by connecting the plurality of charging ports to a plurality of chargers. However, controlling the plurality of chargers can be complex, resulting in unexpected errors or malfunctions of the EV.

SUMMARY

Therefore, it is an aspect of the present disclosure to provide an EV chargeable with electricity through a plurality of chargers, which changes signal transmission/reception (Tx/Rx) orders in various ways during a charging mode in which the EV is charged using the plurality of chargers, and a method for controlling the same. This results in avoidance of unexpected errors or malfunctions caused by signal interference.

Additional aspects of the disclosure will be set forth in part in the description which follows and, in part, will be apparent from the description, or may be learned by practice of the disclosure.

In accordance with embodiments of the present disclosure, a vehicle may include: a plurality of charging ports electrically coupled to a first connector and a second connector, each of the first and second connectors configured to receive power from at least one charger; and a controller configured to receive a charging start command and, upon receiving the charging start command, to control operation of the vehicle to be sequentially paired with the first connector and the second connector when the first connector and the second connector are electrically coupled to the plurality of charging ports.

The first connector and the second connector may respectively correspond to different chargers. The controller may include a first charging controller and a second charging controller. The different chargers may be sequentially paired with the first charging controller and the second charging controller, respectively.

When pairing between the first connector and the controller is completed, the controller may ignore a pairing response signal corresponding to the second connector in response to a pairing request signal needed to initiate pairing between the second connector and the controller.

The controller may acquire a network address corresponding to the first connector based on the pairing between the first connector and the controller, to compare a network address included in a pairing response signal corresponding to the second connector with a network address of the first connector, and to determine whether to ignore a pairing response signal corresponding to the second connector according to the comparison of the network address included in the pairing response signal corresponding to the second connector with the network address of the first connector.

The controller may transmit a channel formation command corresponding to the first charging controller, receive a channel formation completion signal from the first charging controller when pairing between a charger corresponding to the first connector and the first charging controller is completed, thus forming a communication channel between the charger and the first charging controller, transmit a channel formation command corresponding to the second charging controller, and perform pairing between a charger corresponding to the second connector and the second charging controller.

The controller may activate pairing based on information relating to a coupling state between each of the first and second connectors and the plurality of charging ports.

The controller may form a communication channel between the controller and a charger corresponding to the first connector through Power Line Communication (PLC), to transmit a charger control signal corresponding to the first connector via the communication channel, and receive charging information of the vehicle and state information of the charger corresponding to the first connector.

The controller may transmit the pairing request signal to the at least one charger, receive a pairing response signal corresponding to the pairing request signal from the at least one charger, and pair with the at least one charger based on the pairing request signal and an attenuation ratio of the pairing request signal included in the pairing response signal.

Upon receiving the charging start command, the controller may receive a communication request signal from the at least one charger.

The controller may transmit a pairing request signal to the at least one charger, receive a pairing response signal corresponding to the pairing request signal, and pair with the at least one charger after receiving the pairing response signal.

Furthermore, in accordance with embodiments of the present disclosure, a vehicle may include: at least one processor, and at least one memory communicably connected to the at least one processor. The at least one processor may receive a charging start command and, upon receiving the charging start command, control operation of the vehicle to be sequentially paired with a first connector and a second connector when the first connector and the second connector are electrically coupled to a plurality of charging ports.

Furthermore, in accordance with embodiments of the present disclosure, a method of controlling a vehicle may include: electrically connecting a first connector and a second connector to a plurality of charging ports, each of the first and second connectors configured to receive power from at least one charger; receiving, by a controller, a charging start command; and upon receiving the charging start command, controlling, by the controller, operation of the vehicle to be sequentially paired with the first connector and the second connector when the first connector and the second connector are electrically coupled to the plurality of charging ports.

The first connector and the second connector may respectively correspond to different chargers. The controlling the vehicle to be sequentially paired with the first connector and the second connector may include controlling the different chargers to be respectively paired with a first charging controller and a second charging controller equipped in the vehicle.

The method may further include, when pairing between the first connector and the vehicle is completed, ignoring a pairing response signal received from the second connector in response to a pairing request signal needed to activate pairing between the vehicle and the second connector.

The controlling the vehicle to be sequentially paired with the first connector and the second connector may include acquiring a network address corresponding to the first connector based on the pairing between the vehicle and the first connector, comparing a network address included in the pairing response signal corresponding to the second connector with the network address corresponding to the first connector, and ignoring a pairing response signal corresponding to the second connector according to the comparison of the network address included in the pairing response signal with the network address corresponding to the first connector.

The controlling the vehicle to be sequentially paired with the first connector and the second connector may include transmitting a channel formation command corresponding to the first charging controller; forming a communication channel between the charger and the first charging controller; and when pairing between a charger corresponding to the first connector and the first charging controller is completed: receiving a channel formation completion signal from the first charging controller, transmitting a channel formation command corresponding to the second charging controller, and performing pairing between a charger corresponding to the second connector and the second charging controller.

The controlling the vehicle to be sequentially paired with the first connector and the second connector may include forming a communication channel between a charger corresponding to the first connector and the vehicle through Power Line Communication (PLC), transmitting a charger control signal corresponding to the first connector via the communication channel, and receiving charging information of the vehicle and state information of the charger corresponding to the first connector.

The controlling the vehicle to be sequentially paired with the first connector and the second connector may include transmitting a pairing request signal to the at least one charger; receiving a pairing response signal from the at least one charger, the pairing response signal including an attenuation ratio; and performing pairing between the vehicle and the at least one charger based on the pairing request signal and the attenuation ratio of the pairing request signal.

The controlling the vehicle to be sequentially paired with the first connector and the second connector may include, upon receiving the charging start command, receiving a communication request signal from the at least one charger.

The controlling the vehicle to be sequentially paired with the first connector and the second connector may include transmitting a pairing request signal to the at least one charger, receiving a pairing response signal corresponding to the pairing request signal, and performing pairing between the vehicle and the at least one charger.

BRIEF DESCRIPTION OF THE DRAWINGS

These and/or other aspects of the disclosure will become apparent and more readily appreciated from the following description of the embodiments, taken in conjunction with the accompanying drawings of which.

Figure 1:
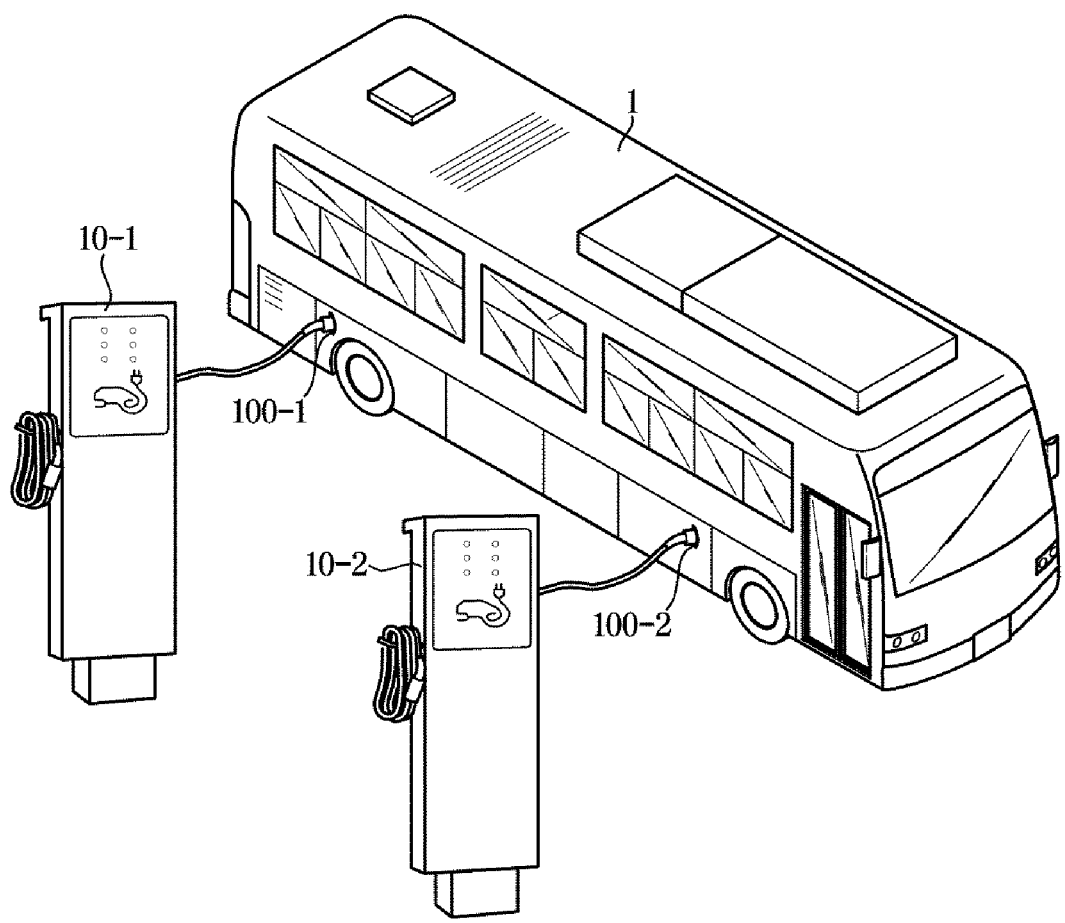
FIG. 1 is a view illustrating an example of the appearance of a vehicle and at least one charger according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the embodiments of the present disclosure, examples of which are illustrated in the accompanying drawings, wherein like reference numerals refer to like elements throughout. It should be noted that the specification of the present disclosure does not describe all the constituent elements of the embodiments, and general matters well known to those skilled in the art and redundant matters of the embodiments will not be described herein for clarity.

Throughout the specification of the present disclosure, terms "... part", "... module", "... member", "... block", and the like mean an element capable of being implemented by hardware, software, or a combination thereof. As used in the specification and appended claims, the term "... parts", "... modules", "... members", or "... blocks" may be implemented by a single constituent element, or the term "... part", "... module", "... member", or "... block" may include a plurality of constituent elements.

Throughout the specification of the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present disclosure, if it is assumed that a certain part includes a certain component, the term "comprising or including" means that a corresponding component may further include other components unless context clearly indicates otherwise.

Throughout the specification of the present disclosure, if it is assumed that a certain member is referred to as "located ahead of" or "located behind" another element, the terms "located ahead of" or "located behind" mean that the element may be arranged to contact the another element or intervening elements may also be present between two members.

In description of the present disclosure, the terms "first" and "second" may be used to describe various components, but the components are not limited by the terms. These terms may be used to distinguish one component from another component. For example, a first component may be called a second component and a second component may be called a first component without departing from the scope of the present disclosure. The term "and/or" may include a combination of a plurality of items or any one of a plurality of items.

The terms "a", "an", "one", "the" and other similar terms include both singular and plural forms, unless context clearly dictates otherwise.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The principles of the present disclosure and the embodiments of the present disclosure will hereinafter be given with reference to the attached drawings.

FIG. 1 is a view illustrating an example of the appearance of a vehicle and at least one charger according to embodiments of the present disclosure.

As shown in FIG. 1, the vehicle 1 may include a drive device.

The drive device of the vehicle 1 may include a motor configured to generate rotational force upon receiving a power source from a battery.

Power source of the vehicle 1 may be electric energy (or electricity) stored in the battery. The battery may receive electricity from an external device (i.e., a charger) of the vehicle 1.

The vehicle 1 may be coupled to one or more chargers through charging ports 100-1 and 1002 equipped therein, such that the vehicle 1 may charge the battery equipped therein. The vehicle 1 according to embodiments of the present disclosure may be applied to all kinds of chargeable vehicles having batteries, for example, an Electric Vehicle (EV), a Plug-in Hybrid Electric Vehicle (PHEV), a Fuel Cell Electric Vehicle (FCEV), etc.

Prior to starting driving of the vehicle 1, the vehicle 1 may connect the battery to the chargers 10-1 and 10-2, such that the vehicle 1 may be ready to start driving.

Meanwhile, the battery of the vehicle 1 may be directly coupled to a direct current (DC) power source (i.e., a high-speed charger), such that the battery of the vehicle 1 can be rapidly charged at a high speed. Alternatively, the battery of the vehicle 1 may be directly coupled to an alternating current (AC) power source, such that the battery of the vehicle 1 can be slowly charged at a low speed.

In a high-speed charging mode, the high-speed charger used as a DC power source may convert AC power into DC power, and may transmit the DC power to the vehicle 1.

In this case, the charger may be directly coupled to the battery of the vehicle 1 so as to provide the battery with a high current, such that the battery of the vehicle 1 can be fully charged within a shorter period of time.

On the other hand, in a slow-speed charging mode, when the charger transmits AC power to the vehicle 1 using commercial AC power related to a power distribution system, AC power may be converted into DC power within the vehicle 1, such that the battery of the vehicle 1 can be charged with electricity. In the case of using the slow-speed charging mode, it is necessary for an AC voltage supplied from the commercial AC power source to be converted in shape and size into a DC voltage, such that an On-Board Charger (OBC) having a power conversion system (PCS) circuit may be mounted to the vehicle 1.

Meanwhile, the vehicle 1 may be provided as an electric bus provided with a two-port charging system.

Figure 2:
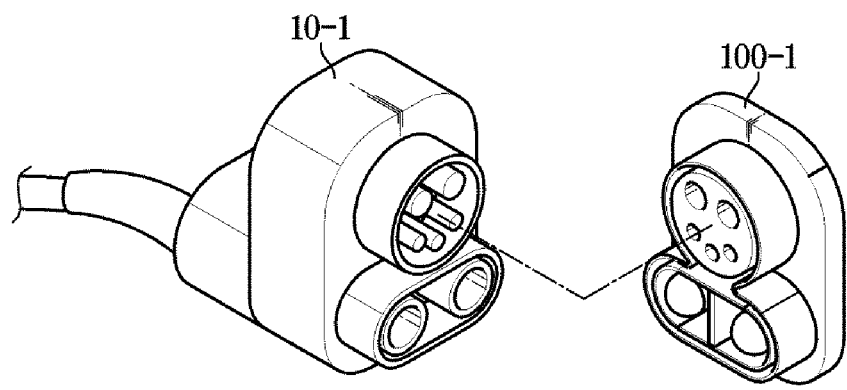
FIG. 2 is a conceptual diagram illustrating a method for charging a vehicle using only one charger.

FIG. 2 is a conceptual diagram illustrating a method for charging the vehicle 1 using only one charger.

Figure 3:
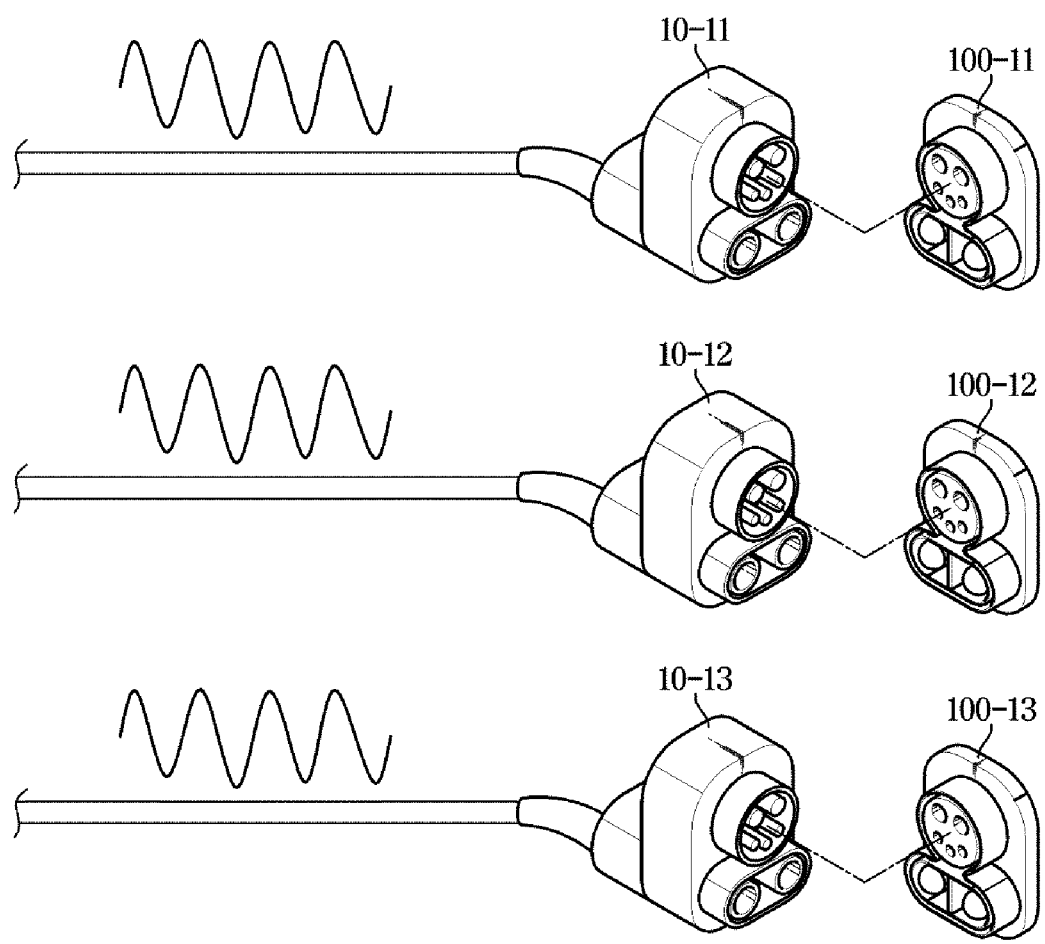
FIGS. 3 and 4 are conceptual diagrams illustrating a method for charging a vehicle using a plurality of chargers.
Figure 4:
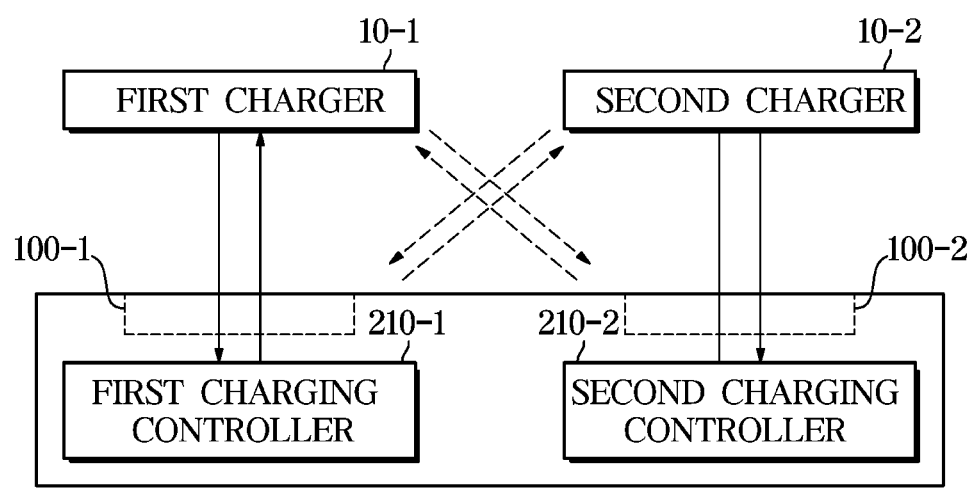

FIGS. 3 and 4 are conceptual diagrams illustrating a method for charging the vehicle 1 using a plurality of chargers.

As shown in FIG. 2, the charging port 100-1 of the vehicle 1 may be coupled to a connector 10-1 of the charger, such that the battery of the vehicle 1 can be charged. In order to reduce an overall charging time using only one charger, there is a need to increase not only a capacity of the charger, but also a capacity of electronic components equipped in the vehicle 1. In this case, since only one control module equipped in the vehicle 1 and only one charger are used, there is no signal interference between the charger and the control module.

On the other hand, in order to increase a charging speed of the vehicle 1 without greatly changing an Electric Vehicle Supply Equipment (EVSE) of the charger and the vehicle 1, a plurality of chargers 10-11, 10-12, and 10-13 may be used as shown in FIG. 3. The respective chargers 10-11, 10-12, and 10-13 may be respectively charged using charging ports 100-11, 100-12, and 100-13 equipped in the vehicle 1.

FIG. 4 is a block diagram illustrating the exemplary case of FIG. 3. When the vehicle 1 is charged using the first charger 10-1 and the second charger 10-2, it is necessary to establish communication between each charger 10-1 or 10-2 and the vehicle 1 in advance.

Meanwhile, each charger and the vehicle 1 may communicate with each other through Power Line Communication (PLC). Power Line Communication (PLC) may be a communication method for transmitting/receiving signals through a power line through which electricity is supplied. Power Line Communication (PLC) may allow signals to be transmitted to a 60 Hz frequency band and other frequency bands (i.e., 1~30 MHz frequency bands), resulting in establishment of very high speed communication.

Therefore, the vehicle 1 and the chargers 10-1 and 102 may communicate with each other through the connected power line therebetween.

Although a user has to basically communicate with the first charging controller 210-1 corresponding to the first charger 10-1 or the second charging controller corresponding to the second charger 10-2, the first charger 10-1 and the second charger 10-2 may incur signal interference in the first charging controller 210-1 and the second charging controller 210-2, resulting in unexpected errors or malfunctions.

In more detail, in a communication process among the first and second charging controllers 210-1 and 210-2 and the first and second chargers 10-1 and 10-2, a channel formation request signal transmitted from the first charging controller 210-1 may be emitted such that the channel formation request signal may wrongly arrive at the second charger 10-2 instead of the first charger 10-1, and a channel formation request signal transmitted from the second charging controller 210-2 may be emitted such that the channel formation request signal may wrongly arrive at the first charger 10-1 instead of the second charger 10-2. As a result, the first charger 10-1 scheduled to perform charging through the first charging controller 210-1 may have difficulty in easily charging the battery of the vehicle 1, and the second charger 10-2 scheduled to perform charging through the second charging controller 210-2 may have difficulty in easily charging the battery of the vehicle 1.

Therefore, a time delay may be assigned to Signal Level Attenuation Characterization (SLAC) to be used for matching the respective chargers to the vehicle 1 prior to beginning of signal communication between each charging controller and each charger, such that signal interference between each charger and each charging controller can be prevented.

The Signal Level Attenuation Characterization (SLAC) action may be used to prevent the vehicle 1 from being wrongly connected to a contiguous charger during an initial connection setting process between the vehicle 1 and any of the chargers. The SLAC action should be essentially carried out in advance, prior to beginning of the above PLC-based charging action.

In more detail, the vehicle 1 may transmit a request signal and a predetermined number of messages to one or more chargers through a controller 200. When the chargers receive the request signal from the vehicle 1, the chargers may determine an attenuation ratio of the signal received from the vehicle 1, and may transmit a response signal including the determined attenuation ratio to the vehicle 1.

If the attenuation ratio included in each signal received from the chargers is equal to or less than a predetermined attenuation ratio (e.g., 20 dB), this means that the vehicle 1 was physically connected to the chargers.

A method for allowing at least one charging controller 210 (210-1 and 210-2) and at least one charger to sequentially perform the SLAC action with a time difference therebetween will hereinafter be described with reference to the attached drawings.

Figure 5:
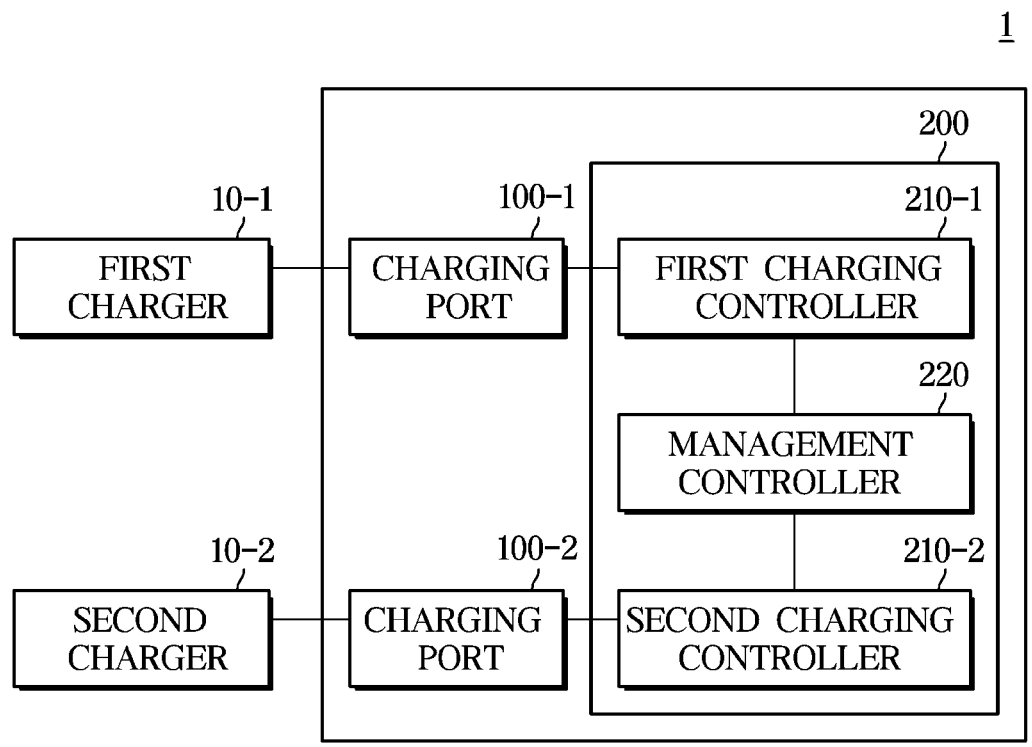
FIG. 5 is a block diagram illustrating a vehicle charging system according to embodiments of the present disclosure.

FIG. 5 is a block diagram illustrating a vehicle charging system according to embodiments of the present disclosure.

As shown in FIG. 5, the vehicle charging system may include a first charger 10-1, a second charger 10-2, and a vehicle 1. The vehicle 1 may include a plurality of charging ports 100-1 and 100-2, a first charging controller 210-1, a second charging controller 210-2, and a management controller 220.

Each of the first charger 10-1 and the second charger 10-2 may be implemented as an Electric Vehicle Supply Equipment (EVSE) to charge the vehicle 1. Each of the first charger 10-1 and the second charger 10-2 may receive a constituent element for receiving a charging start command from a user.

When a communication channel corresponding to the first charger 10-1 is formed based on the charging start commands received from the first charger 10-1 and the second charger 10-2, the vehicle 1 may transmit a request signal for forming a communication channel corresponding to the second charger 10-2 to the second charger 10-2.

In more detail, the vehicle 1 may include a first charging port 100-1 to be connected to the first charger 10-1 and a second charging port 100-2 to be connected to the second charger 10-2.

The plurality of charging ports 100-1 and 100-2 may be electrically connected to the first charger 10-1 and the second charger 10-2, respectively.

When the first charger 10-1, the second charger 10-2, and the charging ports 100-1 and 100-2 are electrically interconnected and a charging start command is then input to the controller 200, the controller 200 may control operation of the vehicle 1 to be sequentially paired with the first charger 10-1 and the second charger 10-2.

Although the term "charging start command" used in the present disclosure conceptually includes a process for allowing the user to directly input a command for activating charging to charger(s), the scope or spirit of the present disclosure is not limited thereto, the charging start command may also be activated by any charging-related behavior of the user, for example, behavior of the user who inserts the charger(s) into the charging port(s) of the vehicle, without activation of a user input command.

In addition, when a communication channel corresponding to the first charger 10-1 is formed, the vehicle 1 may transmit a request signal for forming a communication channel corresponding to the second charger 10-2 to the second charger 10-2 through the charging port.

The controller 200 may include the first charging controller 210-1 and the second charging controller 210-2.

The management controller 220 included in the controller 200 may control operation of the first charger 10-1 to be paired with the first charging controller 210-1, and may then control operation of the second charger 10-2 to be paired with the second charging controller 210-2. In this way, the first and second chargers 10-1 and 10-2 may be sequentially paired with the first and second charging controllers 210-1 and 210-2, respectively.

In more detail, the management controller 220 may transmit a channel formation request signal to at least one of the first charging controller 210-1 corresponding to the first charger 10-1, the second charging controller 210-2 corresponding to the second charger 10-2, the first charging controller 210-1, and the second charging controller 210-2, and may receive a channel formation completion signal from at least one of the first charging controller 210-1 and the second charging controller 210-2.

The management controller 220 may be implemented as a Battery Management System (BMS). Meanwhile, the management controller 220 may communicate with the first charging controller 210-1 and the second charging controller 210-2 over a Controller Area Network (CAN), and the first charging controller 210-1 and the second charging controller 210-2 may also communicate with each other over a Controller Area Network (CAN).

The CAN may refer to a network system to perform data communication between processors as well as to control an information communication system, an entertainment system, etc. In more detail, the CAN may transmit data through a pair of twisted data lines or a pair of shield data lines shielded with a covering material.

The CAN may operate according to multi-master principles in which each of the processors for use in master/slave systems may operate as a master.

If the first charging controller 210-1 is paired with the first charger 10-1, the first charging controller 210-1 may ignore (or disregard) a pairing response signal that was received from the second charger 10-2 in response to a pairing request signal transmitted to the second charger 10-2.

In more detail, when a communication channel between the first charging controller 210-1 and the first charger 10-1 is formed such that the first charging controller 210-1 can communicate with the first charger 10-1, the first charging controller 210-1 may receive only the output signal of the first charger 10-1 and may ignore the remaining signals. In accordance with one embodiment, the first charger 10-1 may have a unique Media Access Control (MAC) address, and the signal transmitted from the first charger 10-1 to the first charging controller 210-1 may include a Media Access Control (MAC) address of the first charger 10-1. Since the first charging controller 210-1 may also recognize the MAC address of the first charger 10-1 through the above-mentioned SLAC, the first charging controller 210-1 may receive only the signal provided with the MAC address. Since it is expected that an output signal of the second charger 10-2 includes a Media Access Control (MAC) address of the second charger 10-2, the first charging controller 210-1 may distinguish the output signal of the first charger 10-1 and the output signal of the second charger 10-2 from each other, and may ignore the output signal of the second charger 10-2.

The management controller 220 may transmit a channel formation command corresponding to the first charger 10-1 and the other channel formation command corresponding to the second charger 10-2 based on information indicating a coupling state between each of the first and second chargers 10-1 and 10-2 and each of the charging ports 100-1 and 100-2. The charging controller may recognize and determine a coupled or non-coupled state between each charger and each charging port based on a Proximity Detection (PD) signal.

As described above, the vehicle 1 may form the above-mentioned communication channel based on PLC (Power Line Communication) between the vehicle 1 and each charger.

The vehicle 1 may transmit a control signal to the first charger 10-1 through the channel, and may receive vehicle charging information and state information of the first charger 10-1 through the channel.

Although the charging controllers 210-1 and 210-2 and the management controller 220 can be integrated into a single module, the scope or spirit of the present disclosure is not limited thereto, and the charging controllers 210-1 and 210-2 and the management controller 220 may also be formed as different modules as necessary.

The charging controller 210 or the management controller 220 may be implemented as a memory (not shown) to store an algorithm for controlling constituent elements or data of a program related to the algorithm, or may be implemented as a processor (not shown) for performing the above-mentioned operation using data stored in the memory. In this case, the memory and the processor may be implemented as different chips. Alternatively, the memory and the processor may also be implemented as a single chip as necessary.

The charging controller 210 (210-1 and 210-2) and the management controller 220 shown in FIG. 5 may include a communication module. The charging controller 210 and the management controller 220 may include at least one constituent element through which the charging controller 210 and the management 220 can communicate with an external device such as charger(s). For example, each of the charging controller 210 and the management controller 220 may include at least one of a short-range communication module, a wired communication module, and a wireless communication module.

At least one constituent element may be added or deleted in response to performance of individual constituent elements of the system for charging the vehicle 1 shown in FIG. 5. In addition, it is well known to those skilled in the art that mutual positions of the constituent elements can be changed in response to performance or structure of the system without departing from the scope or spirit of the present disclosure.

Meanwhile, individual constituent elements shown in FIG. 5 may be a software constituent element and/or a hardware constituent element such as a Field Programmable Gate Array (FPGA) or an Application Specific Integrated Circuit (ASIC).

Figure 6:
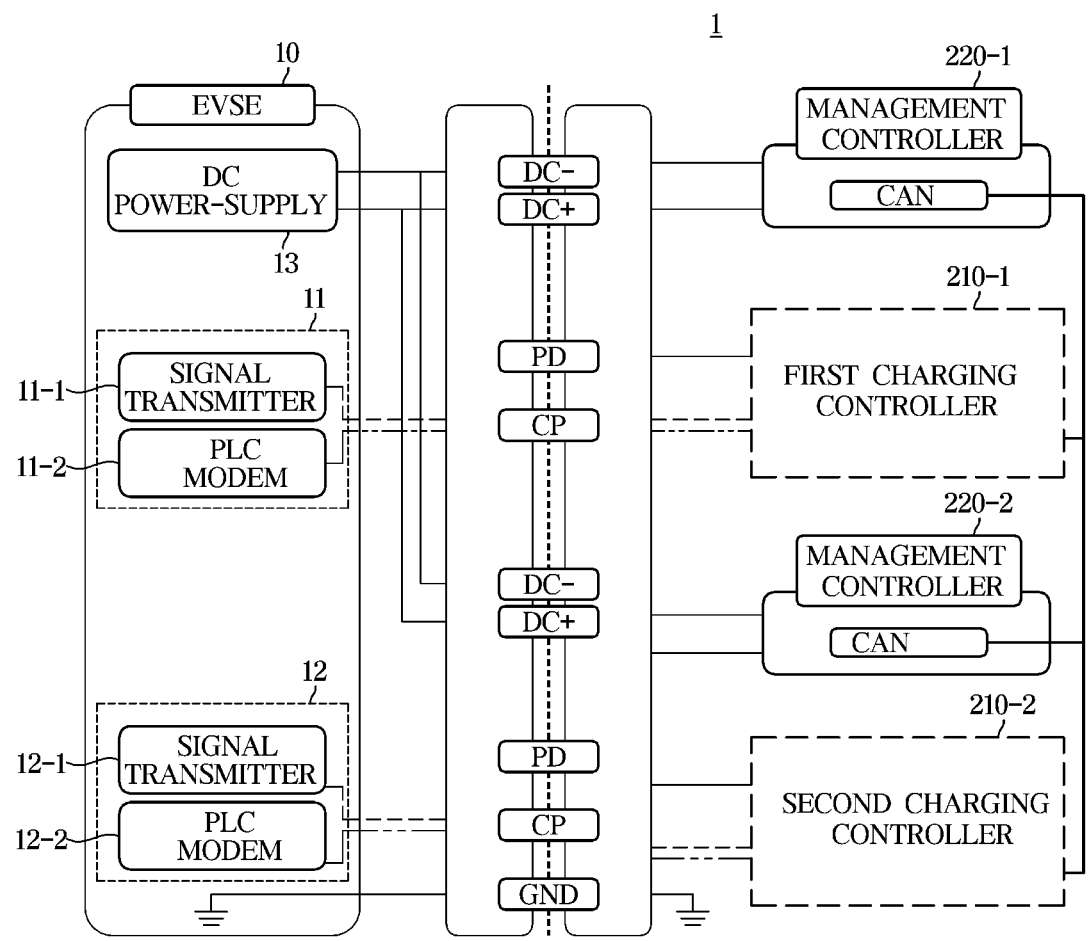
FIG. 6 is a detailed block diagram illustrating the vehicle charging system shown in FIG. 5.

FIG. 6 is a detailed block diagram illustrating the vehicle charging system shown in FIG. 5.

As shown in FIG. 6, each of the first charger 10-1 and the second charger 10-2 may be implemented as Electric Vehicle Supply Equipment (EVSE) 10.

The EVSE 10 may include a DC power-supply 13. The DC power-supply 13 may charge the vehicle 1 with DC power. The EVSE 10 may include not only a signal transmitter 11-1 and a PLC modem 11-2 corresponding to the first charger 10-1, but also a signal transmitter 12-1 and a PLC modem 12-2 corresponding to the second charger 12-2. The EVSE 10 may PLC(Power Line Communication)-communicate with the vehicle 1 through output signals of the signal transmitters 11-1 and 12-1 and output signals of the PLC modems 11-2 and 12-2.

The signal transmitters for use in the EVSE 10 may transmit a signal (e.g., a PWM signal) caused by a charging start command entered by the user to the vehicle 1.

Each charging controller 210-1 or 210-2 may determine the presence or absence of proximity detection (PD) between each charger and each charging port, and may transmit a control signal (CP) to the EVSE 10.

Meanwhile, the output signal of the EVSE 10 may be transmitted to each of the first charging controller 210-1 and the second charging controller 210-2. The EVSE may include a signal including State information.

One charging controller 210 may convert the PLC signal received from the EVSE into a CAN signal, and may transmit the CAN signal to another charging controller and the management controllers 220-1 and 220-2.

Figure 7:
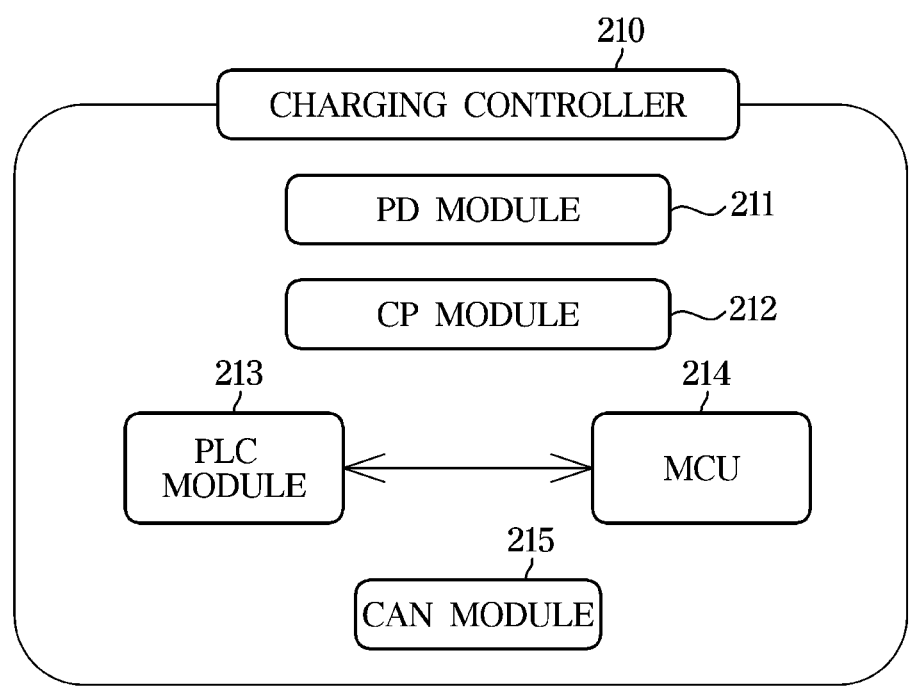
FIG. 7 is a detailed block diagram illustrating a charging controller according to embodiments of the present disclosure.

FIG. 7 is a detailed block diagram illustrating the charging controller 210 according to embodiments of the present disclosure.

As shown in FIGS. 6 and 7, the charging controller 210 may include a Proximity Detection (PD) module 211, a CP module 212, a Power Line Communication (PLC) module 213, a Micro Control Unit (MCU) 214, and a Controller Area Network (CAN) module 215. The PD module 211 may be provided as a circuit to detect a contact or non-contact state between each charger and each charging port equipped in the vehicle 1.

In more detail, the management controller may receive a signal from the PD module 211, such that the management controller may determine whether each of the first charger 10-1 and the second charger 10-2 has been coupled to the vehicle 1.

If the management controller determines a coupled state between each port and each charger and the CP module 212 receives a communication request signal (PWM signal), the management controller may transmit a channel formation command.

The CP module 212 may receive the communication request signal (PWM signal) from each charger. In more detail, the communication request signal may include charger type information, charger state information, and vehicle state information. The CP module 212 may change a voltage level to inform each charger of the beginning of a charging mode.

The CP module 212 may process the communication request signal (PWM signal) received from each charger, and may determine whether the vehicle is in a battery chargeable state using the processed signal.

For example, the CP module may display a coupled or non-coupled state between each charger and the vehicle, and may also display information indicating whether the vehicle battery is chargeable.

The PLC module 213 may receive one or more signals from each charger. Each charger and each charging controller may communicate with each other over Power Line Communication (PLC).

In more detail, the PLC module 213 may transmit and receive the charging control signal to and from each of the chargers. The charging control signal may include various kinds of information to be actually communicated in a sub-charging stage, for example, substantial control information, the amount of charging voltage/current, a faulty state of the vehicle, a faulty state of each charger, and various FLAG- or SLAC-related signals needed for a charging procedure.

The PLC module 213 may perform signal conversion, and may transmit the converted signal to the MCU.

The charging controller 210 may include the MCU 214 and the CAN module 215.

The MCU 213 may be implemented as a processor, and may transmit a control signal and receive a state signal. The MCU 214 may transmit a control signal to another module equipped in the vehicle 1 using the CAN module 215.

Figure 8:
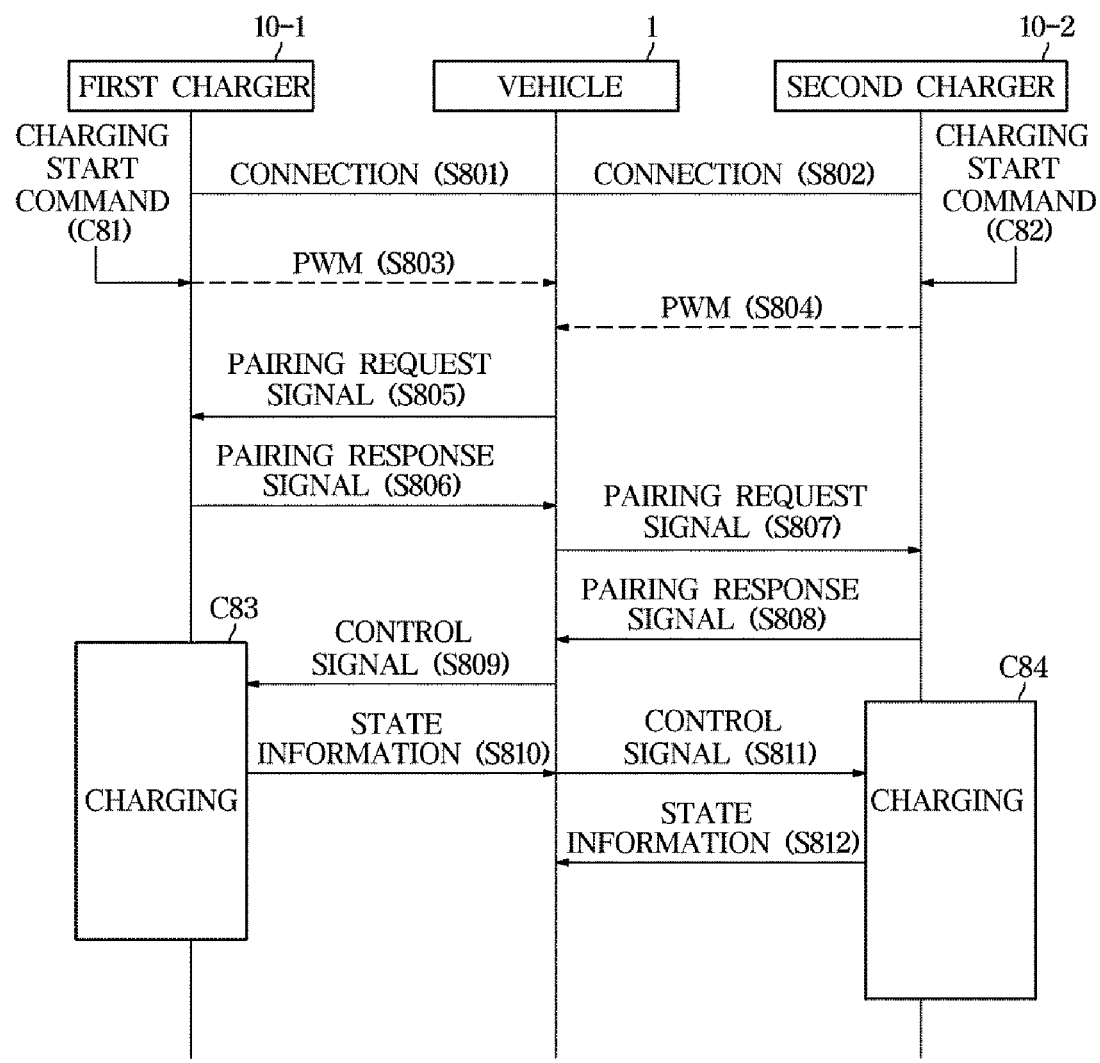
FIG. 8 is a conceptual diagram illustrating flow of signals communicated between the vehicle and at least one charger.

FIG. 8 is a conceptual diagram illustrating flow of signals communicated between the vehicle 1 and at least one charger.

As shown in FIG. 8, the vehicle 1 may be coupled to the first charger 10-1 (S801), and may be coupled to the second charger 10-2 (S802). In more detail, a charging port equipped in the vehicle 1 may be coupled not only to a charging port of the first charger 10-1, but also to a charging port of the second charger 10-2.

If the vehicle 1 is coupled to the first charger 10-1, the user may input a charging start command C81 to the first charger 10-1. If the vehicle 1 is coupled to the second charger 10-2, the user may input a charging start command C82 to the second charger 10-2. Although the charging start command C81 and the other charging start command C82 can be generally entered by the user at different times, it should be noted that the charging start command C81 and the other charging start command C82 can be simultaneously entered by the user as necessary.

The first charger 10-1 may transmit a communication request signal C803 for communication with the vehicle 1 to the vehicle 1 upon receiving the charging start command C81 from the user. The second charger 10-2 may transmit a communication request signal C804 for communication with the vehicle 1 to the vehicle 1 upon receiving the charging start command C82 from the user. In accordance with one embodiment, the communication request signal for communication with the vehicle may be implemented as a signal corresponding to about 5% of a PWM signal.

Upon receiving a signal from the first charger 10-1, the vehicle 1 may transmit a pairing request signal to the first charger 10-1 (S805). Upon receiving a signal from the second charger 10-2, the vehicle may transmit a pairing request signal to the second charger 10-2 (S807). Transmission (Tx) priority of the pairing request signal transmission (S805) may be based on information indicating whether the pairing request signal transmission (S805) is carried out before or after a user command input time at which the user inputs the charging start command. However, the scope or scope of the present disclosure is not limited thereto, and it should be noted that the Tx priority of the pairing request signal transmission (S805) is not always dependent upon the beginning time of the user's charging start command.

The vehicle 1 may transmit the pairing request signal to the first charger 10-1 (S805), and may transmit the pairing request signal to the second charger 10-2 (S807). As can be seen from FIG. 8, the first charger 10-1 and the second charger 10-2 may be sequentially paired with the vehicle 1.

Before the vehicle 1 receives a pairing response signal from the first charger 10-1 (S806) after transmitting the pairing request signal to the first charger 10-1 (S805), the vehicle 1 may not transmit the pairing request signal to the second charger 10-2 (S807). However, when pairing between the vehicle 1 and the first charger 10-1 is completed, the vehicle 1 may transmit the pairing request signal to the second charger 10-2 (S807). In contrast, the first charger 10-1 may activate charging of the vehicle 1 (C83) irrespective of information indicating the pairing state between the second charger 10-2 and the vehicle 1. During a charging process of the vehicle 1, the vehicle 1 may transmit a control signal for controlling operation of the first charger 10-1 to the first charger 10-1 (S809), and may transmit a control signal for controlling operation of the second charger 10-2 to the second charger 10-2 (S811). Meanwhile, the first charger 10-1 may transmit a signal including state information thereof to the vehicle 1 (S810), and the second charger 10-2 may transmit a signal including SOC information thereof to the vehicle 1 (S812).

Figure 9:
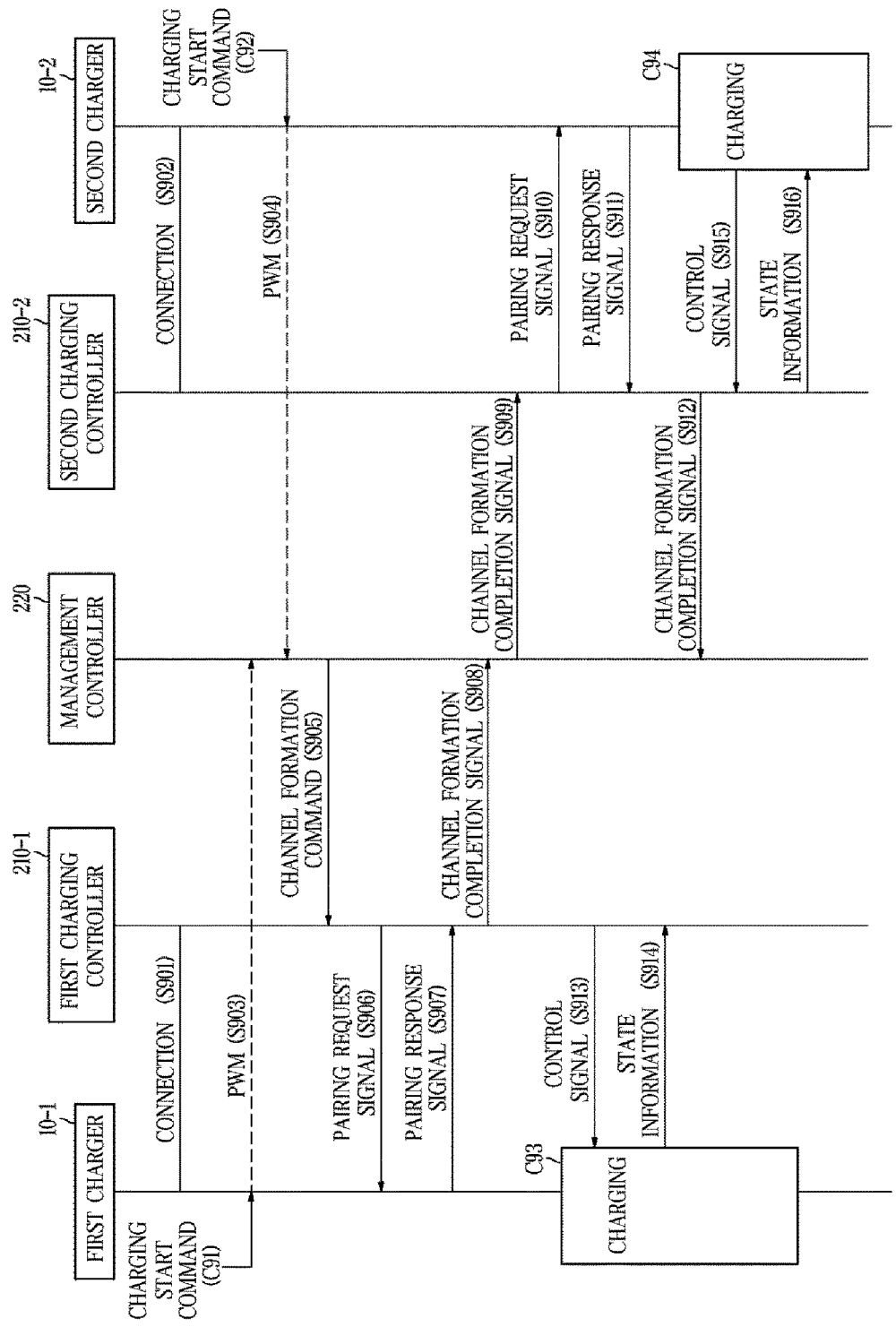
FIG. 9 is a flowchart illustrating the operations shown in FIG. 8.

FIG. 9 is a flowchart illustrating the operations shown in FIG. 8.

As shown in FIG. 9, the controller of the vehicle 1 may include a first controller 210-1 corresponding to the first charger 10-1, a second charging controller 210-2 corresponding to the second charger 10-2, and a management controller 220.

The respective charging controllers may communicate with the respective chargers over Power Line Communication (PLC). The charging controllers may communicate with the management controller over a Controller Area Network (CAN).

The management controller may transmit a channel formation command corresponding to the first charging controller 210-1 (S905) to the first charging controller 210-1.

The channel formation commands S905 and S9005 transmitted from the management controller 220 may be respectively activated by one charging start command C91 and the other charging start command C92 that have been entered by the user who manipulates the chargers. If the user inputs the charging start commands C91 and C92 through the chargers 10-1 and 10-2, the charging controllers may receive a signal based on the user-input charging start commands C91 and C92 to the management controller 220. On the other hand, although the management controller 220 receives a signal associated with the charging start command applied to the second charger 10-2 before transmitting the channel formation command to the first charging controller 210-1 (S905), the management controller 220 may not transmit the channel formation command to the first charging controller 210-1 and the second charging controller 210-2 at similar time points, and may transmit a channel formation command for pairing between the vehicle 1 and the second charger 10-2 (S909) after lapse of a completion time of pairing between the vehicle 1 and the first charger 10-1.

In more detail, when the management controller 220 transmits the channel formation command to the first charging controller 210-1 (S905), the first charging controller 210-1 may transmit the pairing request signal to the first charger 10-1 (S906). The first charger 10-1 may receive a pairing response signal answering the pairing request signal (S906) received from the first charging controller 210-1 (S907). In this way, the first charger 10-1 may be paired with the first charging controller 210-1. After completion of such pairing, a communication channel may be formed between the first charger 10-1 and the first charging controller 210-1.

In accordance with one embodiment, the charger 1 and each charger may be paired with each other through SLAC (Signal Level Attenuation Characterization). In more detail, the vehicle 1 may transmit a pairing request signal (e.g., CM_SLAC_PARM.REQ) to each charger. The vehicle 1 may repeatedly transmit the pairing request signal a predetermined number of times. Meanwhile, when each charger receives the pairing request signal, it is impossible for the charger to transmit a pairing response signal having information indicating a signal attenuation ratio to the vehicle 1. If the attenuation ratio included in the received pairing response signal is equal to or less than a predetermined value (e.g., 20 dB), the vehicle 1 may determine a coupled state between the vehicle 1 and the charger, and may form a communication channel through which the vehicle 1 can communicate with the charger having transmitted the response signal, such that the vehicle 1 can be paired with the connected charger through the communication channel. After SLAC completion, it may be possible to activate a main charging procedure of the vehicle 1.

If the communication channel is formed between the vehicle 1 and the first charger 10-1 through such pairing between the vehicle 1 and the first charger 10-1, the first charging controller 210-1 may transmit a channel formation completion signal to the management controller 220 (S908). Here, the channel formation completion signal (S908) may include specific information indicating that the first charger 10-1 was paired with the first charging controller 210-1 and a communication channel was then formed between the first charger 10-1 and the first charging controller 210-1. The management controller 220 may receive the channel formation completion signal from the first charging controller 210-1 (S908), such that the management controller 220 may determine that the first charger 10-1 was paired with the vehicle 1. Thereafter, if such pairing between the first charger 10-1 and the vehicle 1 is recognized by the management controller 220, the management controller 220 may sequentially transmit the channel formation completion signal needed to initiate such pairing between the vehicle 1 and the second charger 10-2 to the second charging controller 210-2. In the same manner as in the first charger 10-1, the vehicle 1 can also be paired with the second charger 10-2.

Figure 10:
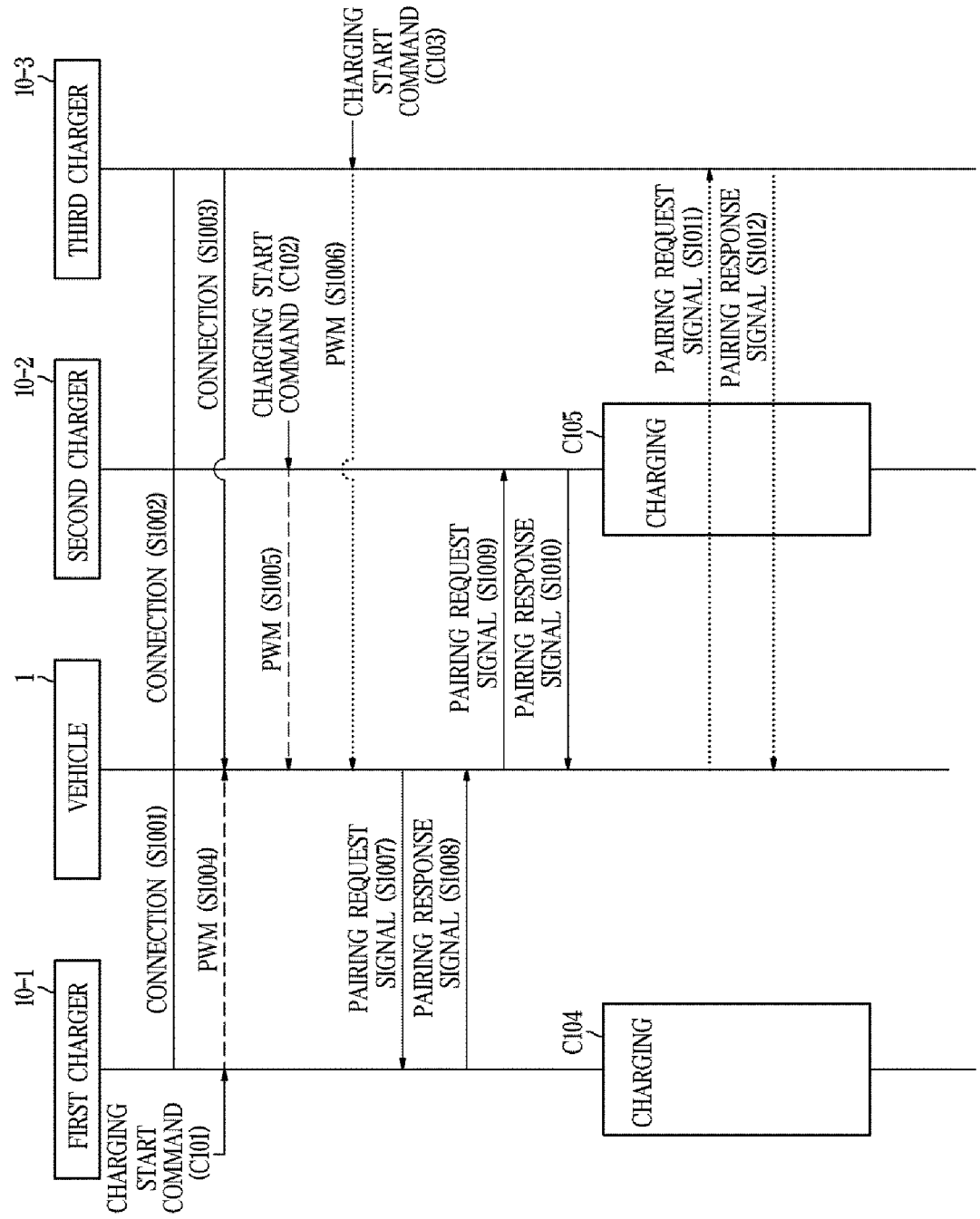
FIG. 10 is a flowchart illustrating a method for pairing the plurality of chargers with the vehicle.

FIG. 10 is a flowchart illustrating a method for pairing three chargers 10-1, 10-2, and 10-3 with the vehicle 1.

Based on the operations illustrated in FIGS. 8 and 10, the vehicle 1 may be sequentially paired with the first charger 10-1 and the second charger 10-2.

The vehicle 1 may be paired with the second charger 10-2, and may then be paired with the third charger 10-3. On the other hand, in the process for pairing the vehicle 1 with each of the first to third chargers 10-1, 10-2, and 10-3, different priorities may be allocated to three pairing processes according to a user-input charging start command, without being limited thereto. For example, when user-input charging start commands C101, C102, and C103 are sequentially input to the first to third chargers 10-1, 10-2, and 10-3, a process of pairing between the vehicle and each charger may be carried out in the same manner as in FIG. 10.

However, in the middle of pairing between the vehicle 1 and the first charger 10-1, if the charging start command of the third charger 10-3 is activated earlier than the charging start command of the second charger 10-2, or if the charging start command of the third charger 10-3 and the charging start command of the second charger 10-2 are simultaneously activated, the vehicle 1 may be sequentially paired with the first charger 10-1, the second charger 10-2, and the third charger 10-3, irrespective of the order of activation of three charging start commands.

That is, although the vehicle 1 is first paired with the first charger 10-1 and the charging start command of the third charger 10-3 is then activated earlier than the charging start command of the second charger 10-3, the vehicle 1 may be paired with the second charger 10-2 earlier than the third charger 10-3. As shown in FIGS. 9 and 10, in the process in which the management controller of the vehicle 1 transmits the channel formation command needed for pairing, the management controller may first be paired with the first charger 10-1, and may then be sequentially paired with other chargers at random.

In the case in which the vehicle 1 is first paired with at least one charger and activates charging, the vehicle 1 may attempt to pair with other chargers, irrespective of the charging process associated with the completely-paired charger. After the vehicle 1 has been sequentially paired with the first charger 10-1 and the second charger 10-2, charging of the vehicle 1 can be activated. As soon as the vehicle 1 receives electricity from the first charger 10-1 and the second charger 10-2, the vehicle 1 may attempt to pair with the third charger 10-3. Meanwhile, the terms "first", "second", and "third" respectively allocated to three chargers may refer only to ordinal numerals for illustrative purposes and better understanding of the present disclosure, and it should be noted that the ordinal numerals allocated to the chargers may not always indicate absolute priority.

Figure 11:
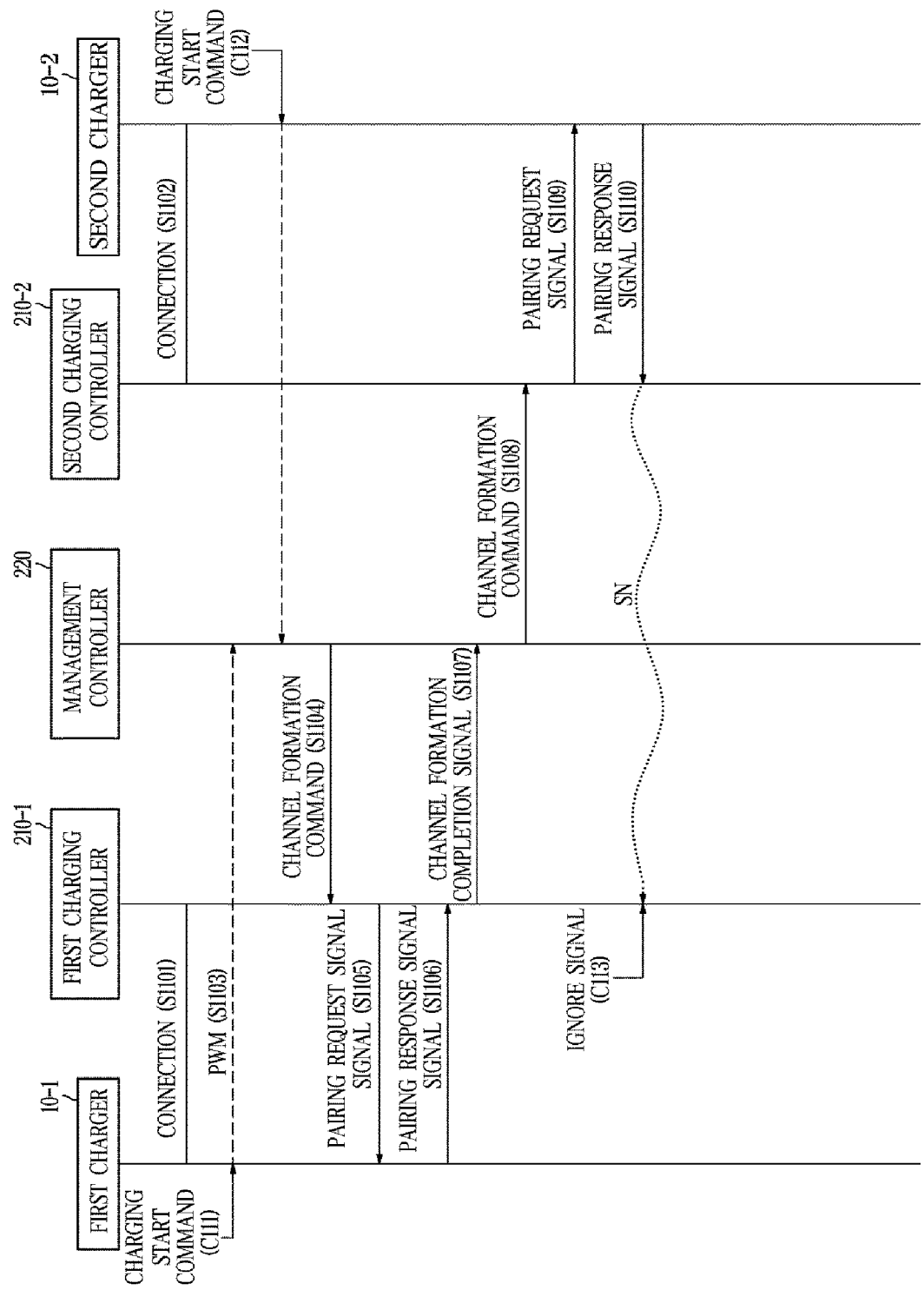
FIG. 11 is a flowchart illustrating a method for, in a pairing mode between the vehicle and any of the chargers, ignoring a pairing response signal received from any of the remaining chargers.

FIG. 11 is a flowchart illustrating a method for, in a pairing mode between the vehicle and any of the chargers, ignoring a pairing response signal received from any of the remaining chargers.

FIG. 11 illustrates an operation process to be carried out after the first charging controller 210-1 of the vehicle 1 has been paired with the first charger 10-1.

As shown in FIG. 11, after completion of such pairing between the vehicle 1 and any charger, the vehicle 1 may receive a signal from the paired charger. In more detail, the charger paired with the vehicle 1 may transmit a response signal having a unique network address dedicated to this paired charger to the vehicle 1. The unique network address may include an IP address, a Port address, and a Media Access Control (MAC) address therein. However, according to embodiments of the present disclosure, since the respective chargers are implemented as different chargers, a unique MAC address dedicated to each charger may be used. In more detail, the MAC address may refer to a physical address of Ethernet acting as a network model used in a Local Area Network (LAN) indicating a local communication network restricted only to a specific zone. The MAC address may be recorded in a Read Only Memory (ROM) of an Ethernet card equipped in the vehicle 1.

Meanwhile, upon receiving a pairing response signal having a network address of the first charger 10-1 from the first charger 10-1, the first charging controller 210-1 may first be paired with the first charger 10-1, and may then receive and use only a signal having the network address of the first charger 10-1. For example, if the MAC address of the first charger 10-1 is denoted by "00-00-00-AB-CD-00-01", the first charging controller 210-1 may accommodate only a signal having the MAC address "00-00-00-AB-CD-00-01", and may ignore or discard the remaining signals having other MAC addresses, for example, "00-00-00-AB-CD-00-02" and the like.

On the other hand, in the process in which the second charging controller 210-2 is paired with the second charger 10-2 after completion of such pairing between the first charger 10-1 and the first charging controller 210-1, the second charger 10-2 may transmit a pairing response signal answering the pairing request signal (S1109) received from the second charging controller 210-2 to the second charging controller 210-2. In this case, the pairing response signal S1110 received from the second charger 10-2 may be emitted in the air (SN), such that the resultant pairing response signal S1110 may be transmitted to the first charging controller 210-1. The first charging controller 210-1 may identify the MAC address of the pairing response signal S1110 received form the second charger 10-2. If necessary, the MAC address of this pairing response signal identified by the first charging controller 210-1 may include another MAC address different from that of the pairing response signal that has been received from the first charger 10-1.

Upon receiving the pairing response signal having another MAC address different from that of the first charger 10-1, from the second charger 10-2, the first charging controller 210-1 may ignore or discard the received pairing response signal having another MAC address different from that of the first charger 10-1 (C113). Meanwhile, although FIG. 11 has exemplarily illustrated only the response signal of the second charger 10-2, the scope or spirit of the operation for identifying a network address of each charger and deciding whether to use the corresponding charger based on the identified result is not limited only to transmission (Tx) signals of the respective chargers, and the corresponding function may also be applied to all kinds of signals capable of being transmitted through other network devices without departing from the scope or spirit of the present disclosure.

The above-mentioned embodiments may be implemented in the form of a recording medium storing commands capable of being executed by a computer system. The commands may be stored in the form of program code. When the commands are executed by the processor, a program module is generated by the commands so that the operations of the disclosed embodiments may be carried out. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, etc.

As is apparent from the above description, a vehicle and a method for controlling the same according to the embodiments of the present disclosure may change signal transmission/reception (Tx/Rx) orders in various ways during a charging mode in which the vehicle (i.e., EV) is charged with electricity using a plurality of chargers, resulting in avoidance of unexpected errors or malfunctions caused by signal interference.

The vehicle and the method for controlling the same according to the embodiments may establish a simultaneous charging mode based on multiple ports without incurring interference between signals, resulting in reduction in a total charging time of a high-voltage battery equipped in the vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
a plurality of charging ports comprising a first charging port and a second charging port, electrically coupled to a first connector and a second connector, respectively, wherein the first connector is configured to receive power from a first charger and the second connector is configured to receive power from a second charger; and
a controller configured to receive a charging start command and, upon receiving the charging start command, to control operation of the vehicle to be sequentially pair with the first charger and the second charger by transmitting a first paring request signal to the first charger and a second paring request signal to the second charger when the first connector and the second connector are electrically coupled to the first and second charging ports respectively,
wherein, when the first charger and the controller are pairing the controller is configured to ignore a pairing response signal between the second charger and the controller,
wherein, when pairing between the controller and the first charger is completed, the controller is configured to transmit the second paring request signal to the second charger.

2. The vehicle according to claim 1, wherein the controller is configured to activate pairing based on information relating to a coupling state between each of the first and second connectors and the first and second charging ports.

3. The vehicle according to claim 1, wherein the controller is configured to:
form a communication channel between the controller and the first charger corresponding to the first connector through Power Line Communication (PLC);
transmit a charger control signal corresponding to the first connector via the communication channel; and
receive charging information of the vehicle and state information of the first charger corresponding to the first connector.

4. The vehicle according to claim 1, wherein the controller is configured to:
transmit the pairing request signal to one of the first charger and second charger, to receive a pairing response signal corresponding to the pairing request signal from one of the first charger and second charger; and
pair with one of the first charger and second charger based on the pairing request signal and an attenuation ratio of the pairing request signal included in the pairing response signal.

5. The vehicle according to claim 1, wherein upon receiving the charging start command, the controller is configured to receive a communication request signal from one of the first charger and second charger.

6. The vehicle according to claim 1, wherein:
the controller includes a first charging controller configured to pair with the first charger and a second charging controller configured to pair with the second charger.

7. The vehicle according to claim 6, wherein the first charging controller is configured to:
acquire a network address corresponding to the first charger based on the pairing between the first charger and the first controller,
compare a network address included in a pairing response signal corresponding to the second charger with a network address of the first charger, and
determine whether to ignore the pairing response signal corresponding to the second charger according to the comparison of the network address included in the pairing response signal corresponding to the second charger with the network address of the first charger.

8. The vehicle according to claim 6, wherein the controller is configured to:
transmit a channel formation command corresponding to the first charging controllers;
receive a channel formation completion signal from the first charging controller when pairing between the first charger and the first charging controller is completed, thus forming a communication channel between the first charger and the first charging controller;
transmit a channel formation command corresponding to the second charging controller; and
perform pairing between the second charger and the second charging controller.

9. A method of controlling a vehicle comprising:
electrically connecting a first connector configured to receive power from a first charger to a first charging port of the vehicle,
electrically connecting a second connector configured to receive power from a second charger to a second charging port of the vehicle;
receiving, by a controller, a charging start command;
upon receiving the charging start command, controlling, by the controller, operation of the vehicle to sequentially pair with the first charger and the second charger by transmitting a first paring request signal to the first charger and a second paring request signal to the second charger when the first connector and the second connector are electrically coupled to the first and second charging ports respectively; and
wherein, when the first charger and the controller are paring, ignoring a pairing response signal between the second charger and the controller; and
wherein, when pairing between the controller and the first charger is completed, transmitting the second paring request signal to the second charger.

10. The method according to claim 9, wherein the controlling of the operation of the vehicle to be sequentially paired with the first charger and the second charger comprises:
acquiring by the first charging controller a network address corresponding to the first charger based on the pairing between the first charging controller and the first charger;
comparing a network address included in the pairing response signal corresponding to the second charger with the network address corresponding to the first charger; and
ignoring a pairing response signal corresponding to the second charger according to the comparison of the network address included in the pairing response signal with the network address corresponding to the first charger.

11. The method according to claim 9, wherein the controlling of the operation of the vehicle to be sequentially paired with the first charger and the second charger comprises:
forming a communication channel between the first charger and the vehicle through Power Line Communication (PLC);
transmitting a charger control signal corresponding to the first charger via the communication channel; and receiving charging information of the vehicle and state information of the first charger.

12. The method according to claim 9, wherein the controlling of the operation of the vehicle to be sequentially paired with the first charger and the second charger comprises:
   transmitting a pairing request signal to one of the first charger and second charger;
   receiving a pairing response signal one of the first charger and second charger, the pairing response signal including an attenuation ratio; and
   performing pairing between the vehicle and one of the first charger and second charger based on the pairing request signal and the attenuation ratio of the pairing request signal.

13. The method according to claim 9, wherein the controlling of the operation of the vehicle to be sequentially paired with the first charger and the second charger comprises, upon receiving the charging start command, receiving a communication request signal from one of the first charger and second charger.

14. The method according to claim 9, wherein the controlling of the operation of the vehicle to be sequentially paired with the first charger and the second charger comprises:
   transmitting a pairing request signal to one of the first charger and second charger;
   receiving a pairing response signal corresponding to the pairing request signal; and performing pairing between the vehicle and one of the first charger and second charger.

15. The method according to claim 9, wherein controlling of the operation of the vehicle to be sequentially paired with the first charger and the second charger comprises controlling a first charging controller and a second charging controller equipped in the vehicle to pair the first and second chargers respectively.

16. The method according to claim 15, wherein the controlling of the operation of the vehicle to be sequentially paired with the first charger and the second c charger comprises:
   transmitting a channel formation command corresponding to the first charging controller;
   forming a communication channel between the charger and the first charging controller; and
   when pairing between the first charger and the first charging controller is completed:
      receiving a channel formation completion signal from the first charging controller,
      transmitting a channel formation command corresponding to the second charging controller, and
      performing pairing between a charger corresponding to the second charger and the second charging controller.

* * * * *